Dec. 16, 1924.

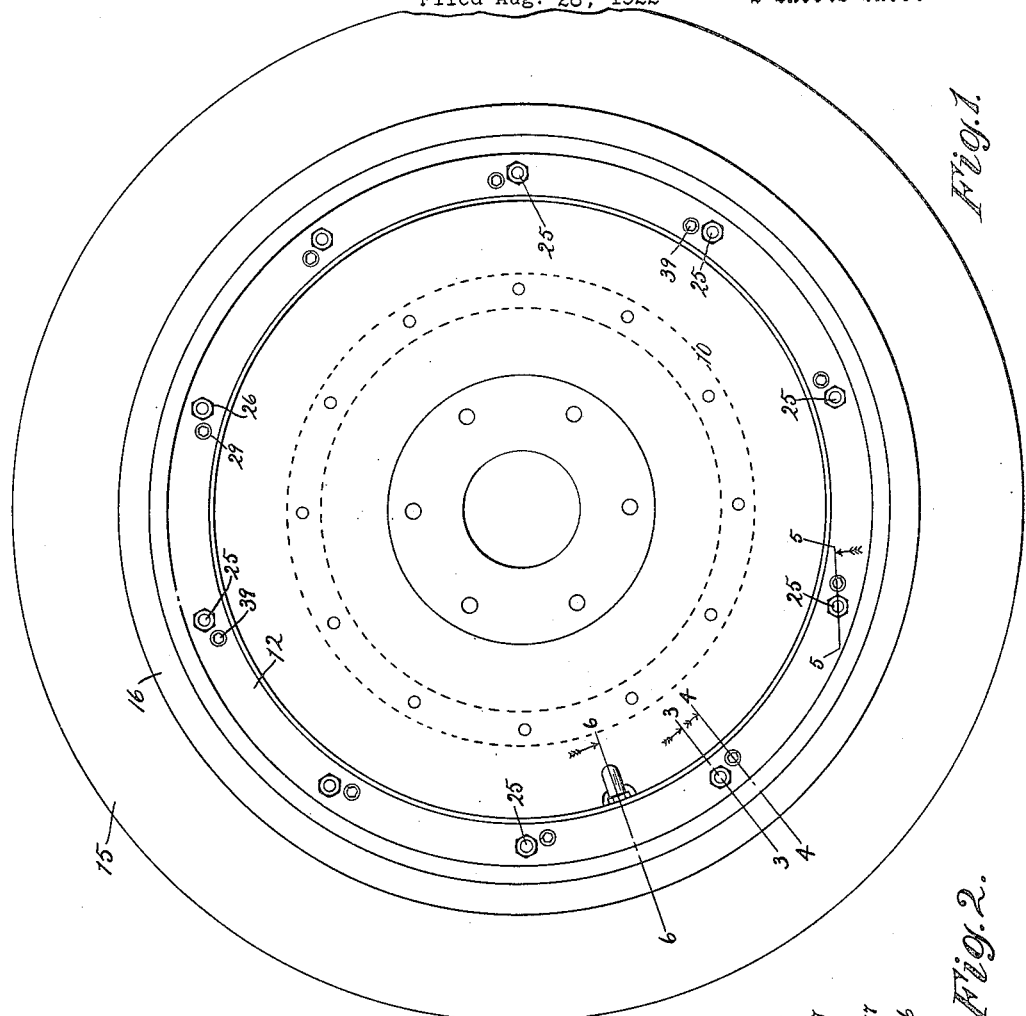
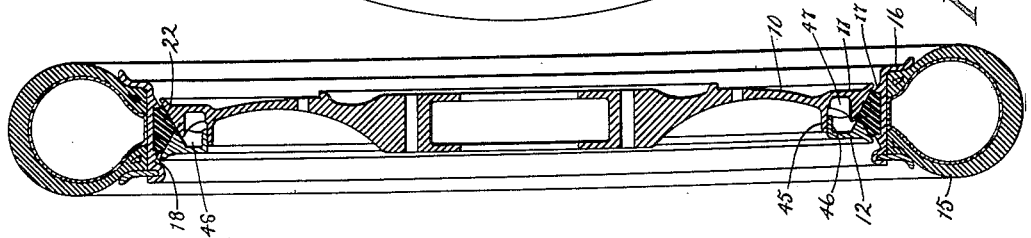

R. JARDINE

DEMOUNTABLE RIM

Filed Aug. 28, 1922

Inventor:
Robert Jardine
By Gillson & Gillson
Attys.

Patented Dec. 16, 1924.

1,519,683

UNITED STATES PATENT OFFICE.

ROBERT JARDINE, OF CHICAGO, ILLINOIS, ASSIGNOR TO RICH TOOL COMPANY, OF CHICAGO, ILLINOIS, A CORPORATION OF ILLINOIS.

DEMOUNTABLE RIM.

Application filed August 28, 1922. Serial No. 584,730.

*To all whom it may concern:*

Be it known that I, ROBERT JARDINE, a citizen of the United States, and resident of Chicago, county of Cook, and State of Illinois, have invented certain new and useful Improvements in Demountable Rims, of which the following is a specification, and which are illustrated in the accompanying drawings, forming a part thereof.

The invention relates to automobile wheels of the type having removable rims to permit tire changes without dismounting the tire from the rim. The object of the invention is to provide an improved construction in which a metal to metal contact between the wheel and rim is wholly avoided with a view to eliminating the creaking which otherwise accompanies the wearing of the parts in service, to secure uniform pressure between the wheel and rim at all points, to cushion the road shocks and to prevent the transmission of vibrations from the wheel to the rim and vice versa.

In its preferred form the invention contemplates the interposition of a continuous cushioning ring of rubber or similar elastically displaceable, but non-compressible material between the wheel and rim. A further object of the invention is therefore to provide a reliable connection of the parts when such a ring is employed and to insure an easy removal of the rim from the wheel even after long periods of use.

In the accompanying drawings—

Fig. 1 is a side elevation of a complete wheel embodying the features of improvement provided by the invention;

Fig. 2 is a sectional view taken on a diameter of the wheel shown in Fig. 1;

Figure 3:
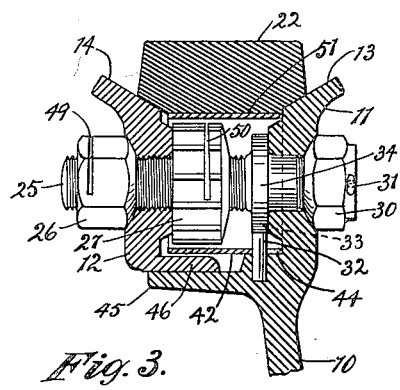
Figs. 3, 4, 5 and 6 are detail sectional views taken on the correspondingly numbered dot and dash lines of Fig. 1, the rim and tire being omitted in Figs. 3 and 4.

The wheel center 10 may take any convenient form, but the felloe preferably comprises relatively movable inner and outer halves 11 and 12, having oppositely beveled wedging surfaces, as 13, 14, at their peripheries. As shown, the inner half 11 of the felloe is formed integral with the wheel center 10 while the outer half 12 of the felloe takes the form of a laterally removable continuous clamping ring. The usual pneumatic tire is shown at 15 and the the rim 16 is of customary form except that upon the inside of the rim there is provided a pair of inwardly facing continuous annular shoulders 17, 18, and a series of studs 19, located between the shoulders.

Figure 6:
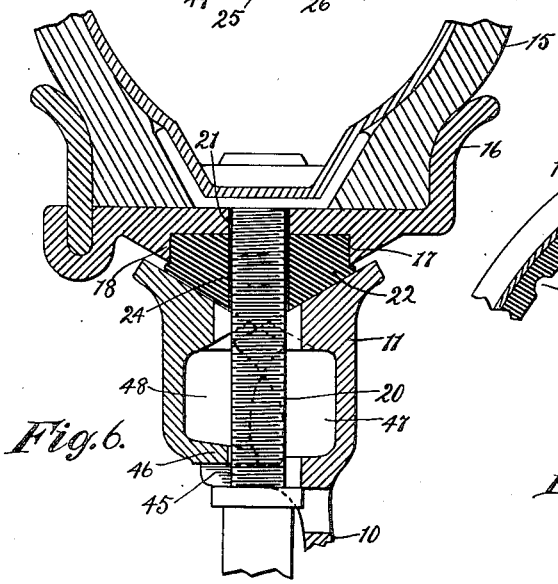

The valve stem 20 projects inwardly through a hole 21 in the rim 16, as usual, and is of sufficient length to extend between and inwardly beyond the two halves 11, 12 of the felloe, the wheel center 10 being preferably dished inwardly to expose the end of the valve stem upon the outside of the same (Fig. 6). The studs 19 may be equally spaced about the inside of the rim but to relieve the valve stem 20 from resisting any of the tendency of the rim to creep, two of these studs are located relatively close together, one at each side of the valve stem opening 21.

Figure 8:
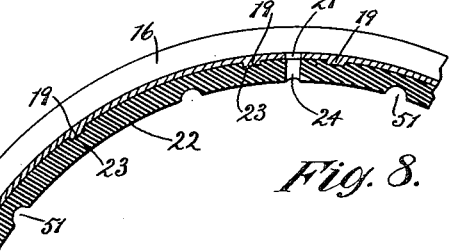
Fig. 8 is a detail central section of the rim and the said interposed rubber ring.

Before placing the rim 16 upon the wheel, the said cushioning ring, as 22, of rubber or the like, is mounted within the rim between the shoulders 17, 18, the ring 22 being formed with notches 23 for receiving the studs 19 and with a valve stem opening 24 (Fig. 8). If desired, the ring 22 may be made of the same quality of rubber and with webbing inserts (not shown) as employed in the construction of solid rubber tires for electric pleasure vehicles. The inside surface of the ring 22 is oppositely beveled, as at 25, 26, to conform in shape with the wedging surfaces 13, 14, of the two halves 11 and 12 of the felloe.

When the cushioning ring 22 and the outer felloe ring 12 are both continuous, as shown, complete removal of the felloe ring 12 is required to permit removal, or application of the rim 16 to the wheel with the cushioning ring 22 mounted in the rim. On the other hand, clamping of the removable felloe ring 12 upon the fixed felloe part 11, serves to firmly confine the cushioning ring 22 between the wedging surfaces 13, 14, of the two halves of the felloe, within the rim 16 and between the annular shoulders 17, 18, formed on the rim, as in Fig. 6, for securely holding the rim upon the wheel. It will be observed, however, that the two parts 11 and 12 of the felloe are so proportioned in size with reference to the diameter of the rim 16 at the shoulders 17, 18, that the rim 16 could not be removed from the wheel when the two halves 11 and 12 of the felloe are connected, even if the cushioning ring 22 were omitted or entirely displaced.

In the particular form of construction illustrated the means for uniting the two halves 11, 12, of the felloe comprises a series of clamping bolts 25 equally spaced about the wheel. As shown, these clamping bolts are fixedly mounted at one end in the stationary half 11 of the felloe and removable nuts 26 are applied to the outer ends of the bolts, over the removable felloe ring 12. Likewise, additional nuts 27 run on the bolts 25 intermediate their ends to effect a forceful separation of the parts, when required, and to provide stop shoulders against which the felloe ring 12 is held by the clamping nuts 26. As shown, the nuts 27 are rotated by being formed to mesh with gear pinions 28 mounted on stub shafts 29, one of which is associated with each of the bolts 25. Under these circumstances, the gear pinions 28 are each wider than the corresponding nut 27 for cooperation with the latter throughout a substantial range of movement of the nut along the bolt.

Figure 5:
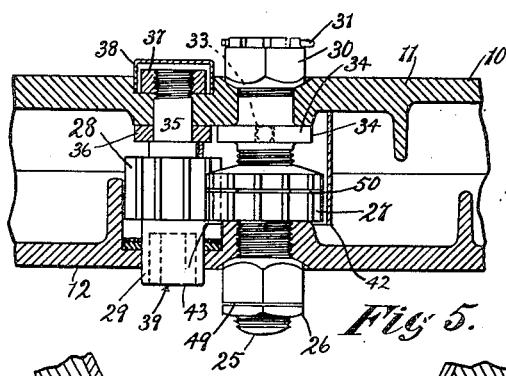

The bolts 25 may be held in the felloe part 11 by clamping nuts 30, each permanently held upon the corresponding bolt, as by a cotter pin 31. Furthermore, rotation of each of the bolts 25 is preferably also prevented, as by a pin 32 (Fig. 3) seated in the felloe part 11 and entering a notch 33 formed in an enlarged part 34 of the bolt, the said enlarged part 34 of the bolt serving in addition to provide a stop shoulder with which the nut 30 cooperates in clamping the bolt in place. Each stub shaft 29 is rotatably mounted in the felloe part 11 adjacent the corresponding bolt 25 (Fig. 5). For this purpose each stub shaft is formed with a reduced end portion 35 on which is placed a washer 36, the reduced end portion 35 of the shaft beyond the washer being set through and held in the wall of the felloe part 11 by a permanently applied nut 37. As shown, the nut 37 is counter sunk in the felloe part 11 and covered by a flanged cap 38 which frictionally enters the socket provided for receiving the nut. The forward end of each stub shaft 29 normally projects through an opening in the removable felloe part 12 and is socketed, as at 39, to receive a wrench (not shown).

Figure 4:
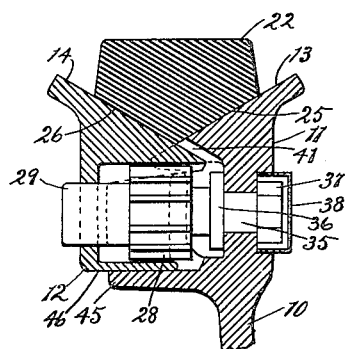
Figure 7:
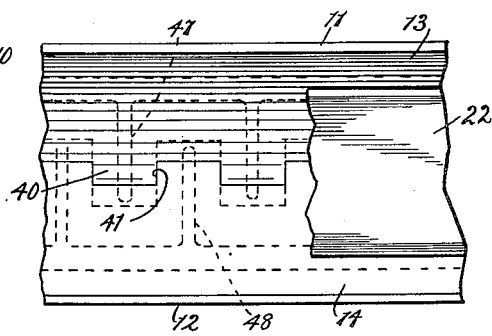
Fig. 7 is a detail edge view of the wheel with the tire and rim omitted and the interposed rubber ring partly broken away.

To provide a substantially continuous wedging surface for engagement with the underside of the cushioning ring 22, regardless of the degree of separation of the felloe parts 11 and 12, the adjacent edges of these felloe parts are preferably formed with alternating complementary tongues and intermediate notches 40, 41, (Figs. 4 and 7). However, since the size of the nuts 27 requires the omission of the tongues 40, 41, from the felloe parts 11, 12, in line with each of the bolts 25 (Fig. 3), engagement of the cushioning ring 22 with the nuts 27 is prevented by mounting a short section of tubing 42 in the felloe part 11 to enclose each of the bolts 25 and the corresponding nut 27. As most clearly shown in Fig. 5 this tubing is formed with a notch 43 at one side, to permit the pinion 28 to enter the same for engagement with the nut 27, and with a second notch 44 at one end to receive the pin 32 (Fig. 3).

It follows from the construction just described that the cushioning ring 22 must be notched at intervals upon the inside, as at 51 (Fig. 8) to receive the sections of tubing 42. The engagement of these sections of tubing with the notches 51 serve to anchor the cushioning ring 22 against creeping about the felloe. Thus, as the cushioning ring is anchored to the felloe and the rim 16 is anchored to the cushioning ring, there can be no creeping movement of the rim about the wheel.

Referring more particularly to Figs. 2, 3 and 4, it will be observed that the wheel center 10 is formed with a forwardly projecting annular flange 45 while the movable felloe part 12 has a rearwardly directed flange 46 at its inner edge to ride upon the flange 45. Likewise, the felloe parts 11 and 12 are each strengthened by the provision of a transverse web 47, 48, under each of the tongues 40, 41, (Figs. 2 and 7). To prevent accidental rotation of the nuts 26 and 27, each of these nuts may be partially cut through with a saw kerf, as 49, or 50, (Figs. 3 and 5) and distorted in a well known manner, thereby increasing the friction of their engagement with the threaded part of the bolt 25 on which they run.

In applying the rim, as 16, to the wheel a wrench (not shown) is first entered in the socketed ends of the stub shafts 29 for rotating these shafts to run the nuts 27 to the inner ends of the bolts 25. When the rim 16 and removable felloe part 12 are in place, the nuts 26 are applied and drawn tight to compress the cushioning ring 22 as in Fig. 6. The stub shafts 29 are then rotated in the opposite direction to run the nuts 27 forwardly until they engage the inner face of the removable felloe part 12. When the rim, as 16, is to be removed, the nuts 26 are first removed. If the felloe part 12 and rim 16 are not now easily removed from the wheel, the wrench may be used for rotating the stub shafts 29 to forcibly separate the parts by running the nuts 27 outwardly upon the bolts 25.

I claim as my invention:

1. An automobile wheel comprising in combination, a wheel center, a tire carrying rim therefor, a resilient ring interposed between said center and rim and provided with notches, means carried by said center and rim for engaging said notches to prevent the rotation of one part relatively to the other.

2. An automobile wheel comprising, the combination with a wheel center and a removable tire carrying rim therefor, of a continuous ring band of elastic material interposed between the felloe of the wheel center and the rim and overlapping wedge means carried by the wheel center acting laterally inward and radially outward upon the said elastic ring band.

3. An automobile wheel comprising, the combination with a wheel center and a tire carrying rim therefor, the said two parts being separated at all points and having respectively an outwardly facing circumferential channel and an inwardly facing annular channel of a continuous ring band of elastic material lying in the said two channels and filling the space between the wheel center and rim.

4. An automobile wheel comprising, the combination with a wheel center and a tire carrying rim therefor, the said two parts being separated at all points and having respectively an interrupted outwardly facing circumferential channel and an interrupted inwardly facing annular channel of a continuous ring band of elastic material, lying in the said two channels and filling the space between the wheel center and rim, the said elastic ring band being notched upon its inner and outer surfaces for interlocking engagement with the interruptions in the corresponding channels.

5. An automobile wheel comprising the combination with a wheel center and a tire carrying rim therefor, the said two parts being separated at all points, of a continuous ring band of elastic material interposed between the felloe of the wheel center and the rim, fastening devices to prevent lateral displacement of the elastic ring and the rim and transversely extending means on the rim and the wheel center interlocked with the elastic ring to prevent relative rotation.

6. In an automobile wheel, in combination, a wheel center having relatively movable inwardly beveled felloe parts at the two sides thereof, a tire carrying rim having an inwardly facing annular channel, a continuous ring band of elastic material lying in the inwardly facing channel of the rim and entering the space between the beveled faces of the said two felloe parts of the wheel center and clamping bolts acting between the said two felloe parts.

7. In an automobile wheel, in combination, a wheel center having a fixed inwardly beveled felloe part at one side thereof, a removable inwardly beveled ring constituting a companion felloe part, a tire carrying rim having an inwardly facing annular channel, a continuous ring band of elastic material lying in the inwardly facing channel of the rim and entering the space between the beveled faces of the said two felloe parts, clamping bolts acting between the two felloe parts, nuts running on the bolts under the removable felloe part and means operable to turn the nuts when the removable felloe part is in place.

8. In an automobile wheel, in combination, a wheel center having a rim clamping abutment at one side, a removable rim clamp applied to the other side of the wheel center for cooperation with the said abutment and means for securing the rim clamp to the wheel center, said means including a bolt fixed in the wheel center and projecting through the removable rim clamp, a nut running on the bolt under the rim clamp and means operable to turn the nut when the rim clamp is in place.

9. In an automobile wheel, the combination of a wheel center, a rim in spaced relation thereto, an elastic ring between the center and the rim, lateral clamping devices on the wheel center for securing the ring in place, including transverse bolts, and means for supporting the ring clear of the bolts.

ROBERT JARDINE.